United States Patent
Boisjolie et al.

(10) Patent No.: US 8,332,946 B1
(45) Date of Patent: Dec. 11, 2012

(54) METHOD AND SYSTEM FOR PROTECTING ENDPOINTS

(75) Inventors: Darren R. Boisjolie, Valparaiso, FL (US); David Kent Haadsma, Tupelo, MS (US); Gandhi Balasubramaniam, Shalimar, FL (US)

(73) Assignee: AVG Netherlands B.V. (NL)

( * ) Notice: Subject to any disclaimer, the term of this patent is extended or adjusted under 35 U.S.C. 154(b) by 266 days.

(21) Appl. No.: 12/883,162

(22) Filed: Sep. 15, 2010

Related U.S. Application Data (60) Provisional application No. 61/242,683, filed on Sep. 15, 2009.

(51) Int. Cl.
*H04L 29/06* (2006.01)
(52) U.S. Cl. .......................................................... 726/24
(58) Field of Classification Search .................... None
See application file for complete search history.

(56) References Cited

U.S. PATENT DOCUMENTS

| | | | |
|---|---|---|---|
| 8,180,917 B1* | 5/2012 | Yan et al. ....................... 709/234 |
| 2006/0253458 A1* | 11/2006 | Dixon et al. .................... 707/10 |
| 2008/0133540 A1* | 6/2008 | Hubbard et al. ................ 707/10 |
| 2009/0216760 A1* | 8/2009 | Bennett .............................. 707/5 |
| 2009/0282476 A1* | 11/2009 | Nachenberg et al. ........... 726/22 |

FOREIGN PATENT DOCUMENTS

WO  WO 2006/101549 A2 *  9/2006

\* cited by examiner

*Primary Examiner* — William Goodchild
(74) *Attorney, Agent, or Firm* — Pepper Hamilton LLP (57) ABSTRACT

A malware-protection method and a malware-protection system for protecting a computer from malware infection by preventing infected files from executing on the computer before they can do harm. The malware-protection method employs a number of techniques and relies on multiple layers of protection to identify trusted files, prevent execution of untrustworthy files, accurately detect corrupted files, analyze questionable files, and quarantine files. The malware-protection system includes a client-based verification, detection, blocking, and quarantine application that interacts and coordinates protection methods with application-verification servers, scan servers, definition-update servers, and policy servers to deliver intelligent malware protection as a Software-as-a-Service (SaaS) service. All users of the malware-protection system benefit from the detection of malicious files by any other user. The first time a malicious file is detected by any part of the malware-protection system, all the components of the malware-protection system are immediately protected against the malicious file.

20 Claims, 5 Drawing Sheets

METHOD AND SYSTEM FOR PROTECTING ENDPOINTS

CROSS-REFERENCE TO RELATED APPLICATIONS

This Application claims priority from, and incorporates by reference the entire disclosure of, U.S. Provisional Application 61/242,683 filed on Sep. 15, 2009.

BACKGROUND

1. Technical Field

The present invention relates generally to protection of computer systems from malware and, more particularly, but not by way of limitation, to protection of computers in a network-computing environment from malware using a multi-tiered approach.

2. History of Related Art

The term malware is generally understood to refer to various forms of malicious, hostile, intrusive, or annoying software or program code that may cause harm to a computer by, for example, destroying or corrupting data, affecting performance, or assuming control of the computer to perform illegal or unwanted activities. The use of malware-protection technologies, such as, for example, software offering features such as, for example, detection, quarantine, removal, and immunization, and the like, is one way to mitigate the potential damage malware may cause to a computer. However, conventional malware-protection technologies fail to address malware-protection concerns for computers functioning in a network-computing environment.

One of the drawbacks of conventional malware protection is the need to install malware-protection software on each computer in the network-computing environment, which may, for example, greatly increase the logistical support needed to ensure that a consistent version of the malware-protection software is installed and maintained on every computer in the network-computing environment. With the increasing size, complexity, and importance of computer networks, the logistical requirements associated with the use of conventional malware-protection technologies are increasing at an unsustainable rate.

Another consequence of the use of conventional malware-protection technologies in a network-computing environment is the inability of all computers in the network-computing environment to be able to quickly identify and respond to a malware threat that may have previously been identified and responded to by another computer in the same network-computing environment. Conventional network malware-protection strategies require that every computer in the network-computing environment protect itself without coordinated communication with the other computers in the network as to any threat detected and the subsequent response to that threat.

This lack of communication among networked computers may, for example, increase the time to respond to an identified malware threat and allow the malware threat to spread to other computers in the network-computing environment before the malware threat can be detected and responded to by the malware-protection technologies. This lack of communication, may also result in duplicative computational effort as each individual computer in the network-computing environment works to detect and respond to potential malware threats. This duplicative effort often causes degraded computer performance and an unnecessary waste of computing resources that could be put to more productive uses.

SUMMARY OF THE INVENTION

A malware-protection method responsive to an access request for a new file from an endpoint computer of a plurality of endpoint computers, verifies as safe an access location of the new file. The new file is received on the endpoint computer. Responsive to the receipt of the new file on the endpoint computer, the new file is compared against an application-data-signature whitelist in data communication with the endpoint computer. Responsive to a determined status of unknown in response to the comparison of the new file against the application-data-signature whitelist in data communication with the endpoint computer, a new-file fingerprint is generated and transmitted to and application verification server. The new-file fingerprint is compared against an application-data-signature whitelist in data communication with the application verification server. Responsive to a determined status of unknown in response to the comparison of the new-file fingerprint to the application-data-signature whitelist in data communication with the application-verification server, the new file is scanned against a malware definition file in data communication with the application-verification server. Responsive to a determined status of unknown in response to a malware scan, the new file is sent to a cloud-based malware-scanning engine. Responsive to a determination from the cloud-based malware-scanning engine that the new file is not good, the application-data-signature whitelist in data communication with the application-verification server is updated, the endpoint computer is commanded to quarantine the new file, the application-data-signature whitelist in data communication with each endpoint computer of the plurality of endpoint computers is updated, and a malware definition file update is requested for each endpoint computer of the plurality of endpoint computers.

A malware-protection system comprising a plurality of endpoint computers and a load balancer. The load balancer receives an access request for a new file at a location from an endpoint computer of the plurality of endpoint computers. A filter server executing a network-site-verification application determines whether the location of the new file is safe for access prior to the new file being downloaded to the endpoint computer. The downloaded new file is compared against an application-data-signature whitelist in data communication with the endpoint computer to determine whether the file is good. An endpoint-installed application executing on the endpoint computer generates a new-file fingerprint responsive to a determination of unknown in response to the comparison of the new file against the application-data-signature whitelist in data communication with the endpoint computer. An application-verification server compares the new-file fingerprint against an application-data-signature whitelist in data communication with the application-verification server. Responsive to a determination of unknown in response to the comparison of the new-file fingerprint to the application-data-signature whitelist in data communication with the application verification server, the new file is scanned against a malware definition file in data communication with the application-verification server. Responsive to a determination of unknown in response to the scan of the new-file against the malware definition file in data communication with the application-verification server, the new file is sent to a cloud-based malware-scanning engine.

The above summary of the invention is not intended to represent each embodiment or every aspect of the present invention.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention will now be described more fully with reference to the accompanying drawings. The invention may, however, be modified in many different forms and should not be constructed as limited to the embodiments set forth herein; rather, the embodiments are provided so that this disclosure will be thorough and complete, and will fully convey the scope of the invention to those skilled in the art.

In various embodiments, it is advantageous to employ a number of techniques and to rely on multiple protective defense layers in order to identify trusted (i.e., good) files, prevent execution of untrustworthy (i.e., bad) files, accurately detect corrupted files, analyze questionable (i.e., unknown) files, and quarantine files before the files can do harm. Defense layers may be associated with a local computing environment, a cloud-based, network-computing environment, or any other appropriate system segregation consistent with the principles of the invention. A malware-protection system may permit or deny communication among system components in separate defense layers depending on, for example, security policies, assessed threat types, and the like.

Furthermore, in various embodiments, the malware-protection system includes a local, client-based application. The local, client-based application may be, for example, a verification, detection, blocking, and quarantine application that interacts and coordinates protection methods with local or cloud-based application-verification servers, scan servers, definition-update servers, and policy servers in order to deliver intelligent malware protection, such as, for example, as a Software-as-a-Service (SaaS) service. In a typical embodiment, the local, client-based application and all other components of the malware-protection system may be implemented on various software and/or hardware platforms or may be tied to a specific native software or hardware platform.

Furthermore, in a typical embodiment, components of the malware-protection system may communicate with other appropriate components of the malware-protection system regardless of differences in native software or hardware. In other embodiments, communication between components of the malware-protection system may be restricted to between components of the malware-protection system implemented on a specific, native software or hardware platform or between predefined types of software or hardware platforms.

Furthermore, various components of the malware-protection system may be local to or geographically remote from each other. The network-computing environment may be implemented in any appropriate configuration in an effort to ensure, for example, security, efficiency, system maintenance, scalability, and the like.

Moreover, in various embodiments, the malware-protection system provides improved performance response and updates to all users within the malware-protection system. In a typical embodiment, the first time a malicious file is detected by any part of the malware-protection system, all other components of the malware-protection system are protected against the malicious file through a real-time proliferation of threat information related to the malicious file throughout the malware-protection system. Therefore, in a typical embodiment, a discovery of a threat by any one user of the malware-protection system immediately closes a zero-day threat window for all other users of the malware-protection system. The real-time proliferation of threat information also reduces unnecessary computational processing by other users of the malware-protection system in an attempt to detect and mitigate threats. Therefore, improved overall malware-protection system performance and increased malware-protection system security may result. In some embodiments, proliferation of threat information may be other than in real-time. In various embodiments, numerous advantages, including those listed above, may be realized.

Figure 1:
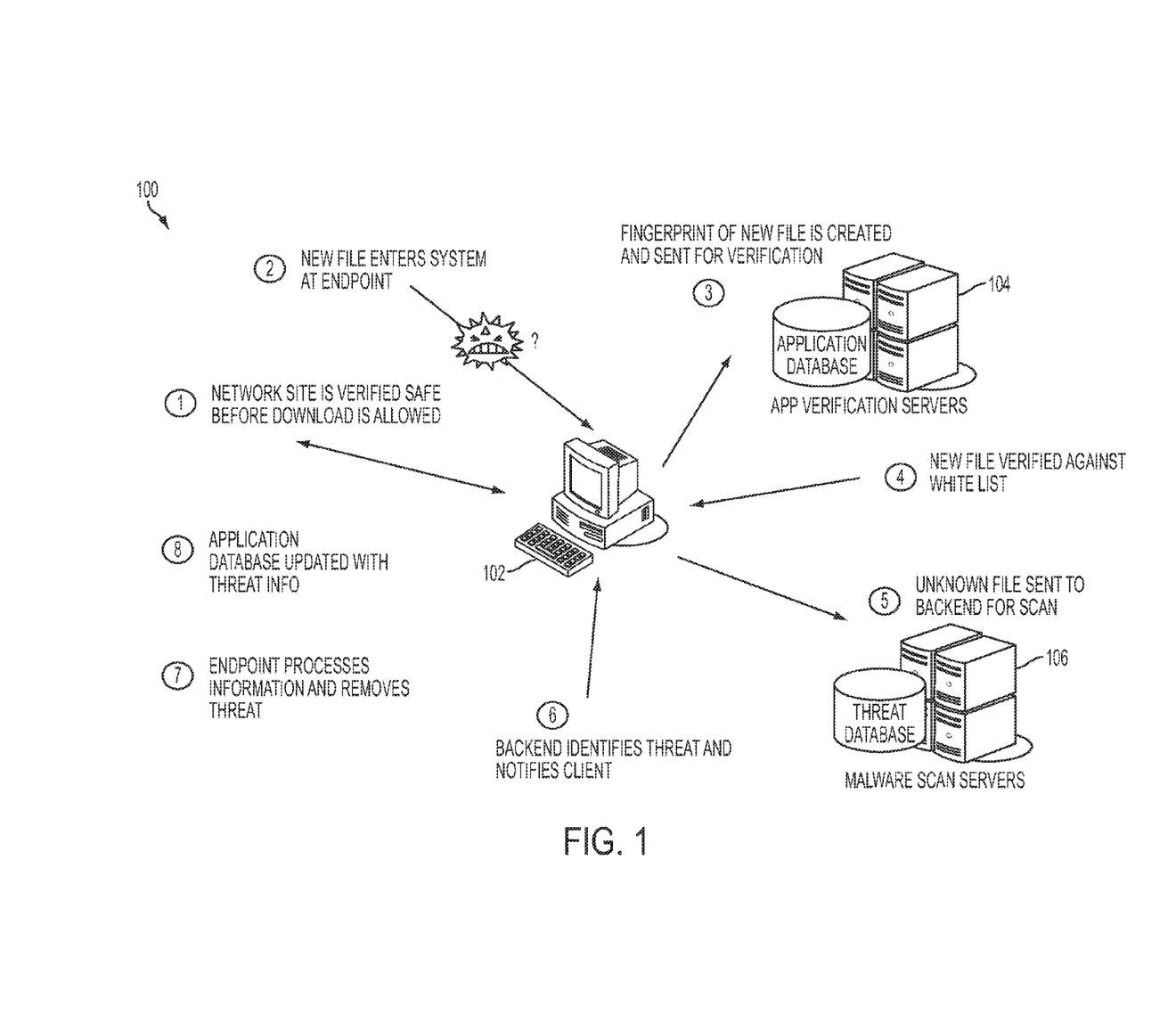
FIG. 1 illustrates a malware-protection method.

Turning now to the FIGURES, FIG. 1 illustrates a malware-protection method 100. The method 100 begins at STEP 1. At STEP 1, a network site for a file is verified with a network-site-verification application before a client computing device 102 (i.e., endpoint) is permitted access to the file. The file may be, for example, a file requested by a user of the endpoint 102. One of ordinary skill in the art will recognize that the endpoint may be of a variety of types, including, for example, a laptop, desktop computer, smartphone, server, and the like. In some embodiments, it is contemplated that the endpoint 102 is a virtual client residing on a physical server. Other types for the endpoint 102, other than those listed herein, will be apparent to one of ordinary skill in the art. In a typical embodiment, the malware-protection method 100 interfaces with a plurality of endpoints, but, for simplicity, only the endpoint 102 is illustrated in FIG. 1.

Verification of the network site is typically performed through the use of a variety of components, such as, for example, client applications, server applications, database systems, web pages, and the like. Other types of verification techniques, other than those listed herein, will be apparent to one of ordinary skill in the art. Various filtering techniques are also typically used to prevent access to network sites based on, for example, domain file extensions, Internet Protocol addresses, geographic location, network type, and the like. Other types of filtering techniques, other than those listed herein, will be apparent to one of ordinary skill in the art. From STEP 1, the method 100 then proceeds to STEP 2.

At STEP 2, a new file from an external source enters the endpoint 102. One of ordinary skill in the art will recognize that the new file may be of a variety of types, including, for example, audio, video, multi-media, text, executable, archives, HTML, and the like. Other types for the new file, other than those listed herein, will be apparent to one of ordinary skill in the art. From STEP 2, the method 100 proceeds to STEP 3.

At STEP 3, a fingerprint for the new file (i.e., a new-file fingerprint) is created by the endpoint 102 and the new-file fingerprint is sent to application-verification servers 104 for verification. The new-file fingerprint is typically created by a function of an endpoint-installed application of the endpoint 102. The new-file fingerprint is typically a checksum or hash of the new file that is used to create a unique signature for the new file. Other types of new-file fingerprints, other than those listed herein, will be apparent to one of ordinary skill in the art. From STEP 3, the method 100 proceeds to STEP 4.

At STEP 4, the application verification servers 104 attempt to verify the new-file fingerprint against an application-data-signature whitelist in data communication with the application-verification servers 104. For the purposes of this application, a whitelist is list or register of entries that are being provided a particular privilege, service, mobility, access, or recognition. In a typical embodiment, the malware-protection method 100 interfaces with a plurality of whitelists, such as, for example, an application-data-signature whitelist in data communication with the endpoint 102. In a typical embodiment, a whitelist may be represented by, for example, a database or databases, a file or combination of files, or the like. Other types of whitelists and representations thereof, other than those listed herein, will be apparent to one of ordinary skill in the art.

In a typical embodiment, the application-verification servers 104 list a disposition for the new-file fingerprint that includes, for example, good, bad/not good, and unknown. For the purposes of this application, good is defined as lacking a malicious behavior or an indication of possible malicious behavior; bad/not good is defined as possessing a malicious behavior or an indication of malicious behavior; and unknown is defined as being neither good nor bad. Other types of dispositions, other than those listed herein, will be apparent to one of ordinary skill in the art. From STEP 4, the malware-protection method 100 proceeds to STEP 5.

At STEP 5, if the verification of the new-file fingerprint in STEP 4 returns that the new file cannot be identified as either good or bad (i.e., is unknown), the new file is sent from the endpoint 102 to malware-scan servers 106 for scanning Various scanning techniques are typically used to detect malware such as, for example, traditional virus-signature-based definition comparison, heuristics, sandbox emulation, analysis, and prediction, and the like. Other types of scanning techniques, other than those listed herein, will be apparent to one of ordinary skill in the art. From STEP 5, the method 100 proceeds to STEP 6.

At STEP 6, the malware-scan servers 106 determine whether a malware threat exists and, if so, notifies the endpoint 102 using malware-threat information through, for example, a web services interface or the like. Other types of notification techniques, other than those listed herein, will be apparent to one of ordinary skill in the art. From STEP 6, the method 100 proceeds to STEP 7.

At STEP 7, the endpoint 102 processes the malware-threat information supplied to the endpoint 102 at STEP 6 by the backend malware-scan servers 106 and removes the malware threat from the endpoint 102. Various removal techniques are typically used, such as, for example, deletion, quarantine, and the like. Other types of removal techniques, other than those listed herein, will be apparent to one of ordinary skill in the art. From STEP 7, the method 100 proceeds to STEP 8.

At STEP 8, in a typical embodiment, the application-data-signature whitelist in data communication with the application-verification servers 104 is updated to include malware-threat information. Additionally, in a typical embodiment, a malware-definition file and the application-data-signature whitelist in data communication with the endpoint 102, as well as any other endpoints, are also updated to reflect currently-known malware-threat information.

Figure 2A:
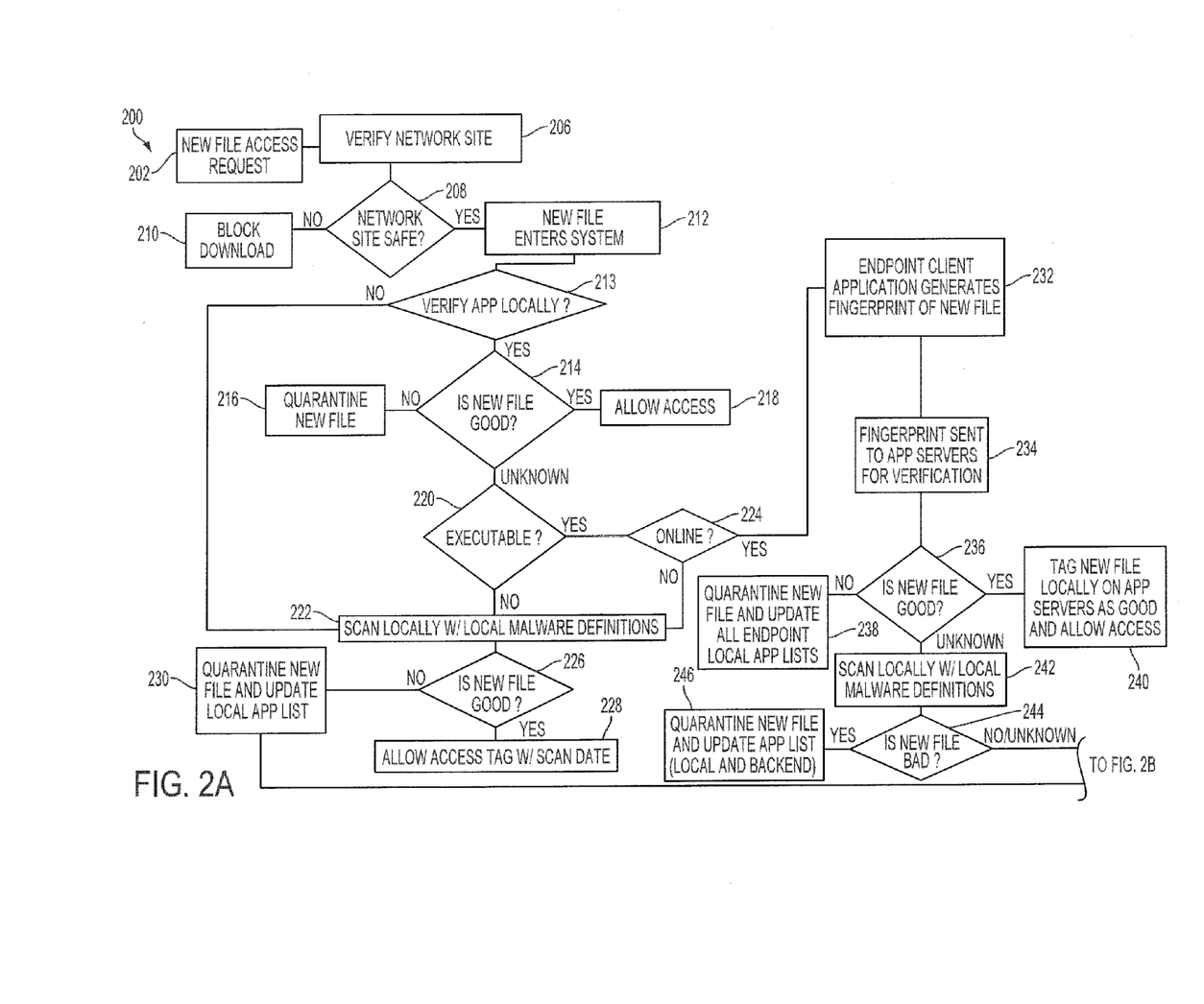
FIG. 2 is a flow chart that describes a malware-protection method.
Figure 2B:
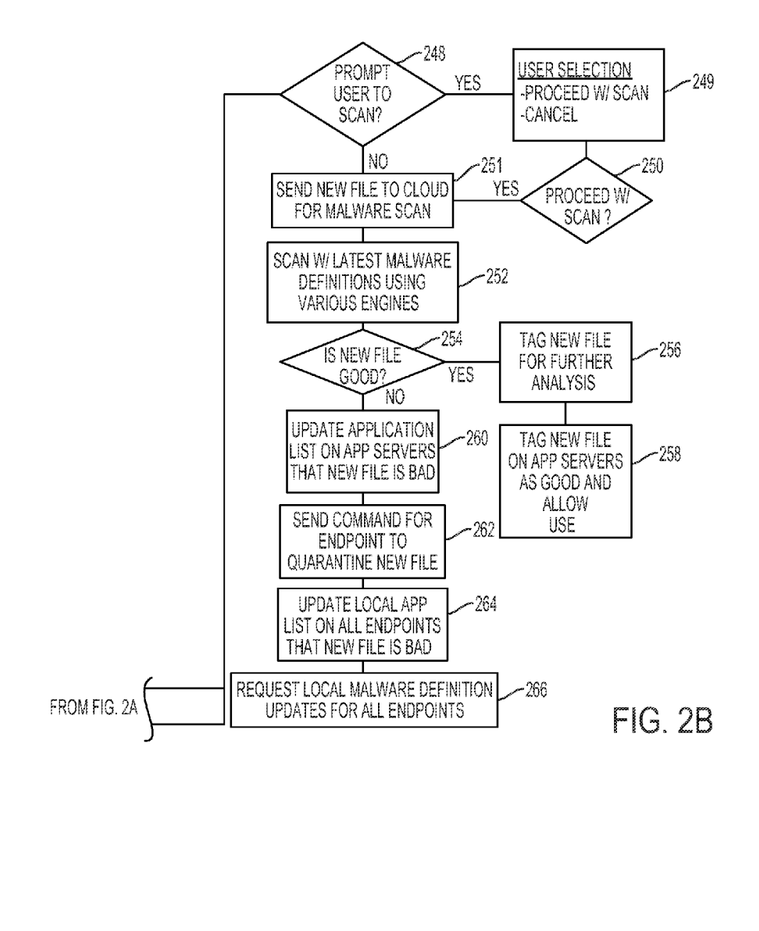

FIGS. 2A and 2B illustrate a flow chart that describes a malware-protection method 200. Referring first to FIG. 2A, the flow 200 begins at STEP 202. At STEP 202, a new-file access request is made by, for example, the endpoint 102 through, for example, a Uniform Resource Locator (i.e., URL) in order to access a new file. Other types of new-file access requests, other than those listed herein, will be apparent to one of ordinary skill in the art. In various embodiments, the new-file access request may be made either through a scheduled process (i.e., batch processing) or in real time. From STEP 202, the flow 200 proceeds to STEP 206.

At STEP 206, an access location (i.e., a network site) of the new file is verified as safe before to the new file is permitted to enter into or be accessed by the endpoint 102. For the purposes of this application, safe is defined as not known to possess any malicious file behavior or malicious files. As previously described with respect to STEP 1 of FIG. 1, verification of the network site is typically performed through the use of a variety of components, such as, for example, client applications, server applications, database systems, web pages, and the like. Other types of verification techniques, other than those listed herein, will be apparent to one of ordinary skill in the art. Various filtering techniques are also typically used to prevent access by the endpoint 102 to network sites based on, for example, domain file extensions, Internet Protocol addresses, geographic location, network type, and the like. Other types of filtering techniques, other than those listed herein, will be apparent to one of ordinary skill in the art. From STEP 206, the flow 200 proceeds to STEP 208.

At STEP 208, a determination may be made whether the network site is safe. Responsive to a determination at STEP 208 that the network site is not safe, the flow 200 proceeds to STEP 210. At STEP 210, access to the new file from the determined-not-safe network site is blocked. However, if at STEP 208 it is determined that the network site is safe, the flow 200 proceeds to STEP 212. At STEP 212, the new file enters the endpoint 102. From STEP 212, the flow 200 proceeds to STEP 213.

At STEP 213, a determination is made, for example, by a user prompt, through a network policy, by a policy on the endpoint 102, and the like, to verify the new file against the application-data-signature whitelist in data communication with the endpoint 102. Responsive to a determination at STEP 213 that the new file is not to be verified against the application-data-signature whitelist in data communication with the endpoint 102, the flow 200 proceeds to STEP 222. However, if at STEP 213 it is determined that the new file is to be verified against the application-data-signature whitelist on endpoint 102, the flow 200 proceeds to STEP 214.

At STEP 214, a determination is made whether the new file is good by comparing the new file against the application-data-signature whitelist in data communication with the endpoint 102. In a typical embodiment, the application-data-signature whitelist in data communication with the endpoint 102 includes lists of the most commonly used applications across each of a plurality of endpoints and of every application on each of the plurality of endpoints. Comparison of the new file to the application-data-signature whitelist in data communication with the endpoint 102 may be performed by any appropriate technique.

Responsive to a determination at STEP 214 that the file is not good, the flow 200 proceeds to STEP 216. At STEP 216, the new file is quarantined in data communication with the endpoint 102 by any appropriate technique. However, if at STEP 214 it is determined that the new file is good, the flow 200 proceeds to STEP 218. At STEP 218, access to the new file is allowed. Access to the new file may include, for example, the ability to execute, view, save, and transfer the new file. Other types of access, other than those listed herein, will be apparent to one of ordinary skill in the art. Responsive to a determination of unknown at STEP 214, the flow 200 proceeds to STEP 220.

At STEP 220, a determination is made as to whether the new file is an executable. Responsive to an affirmative determination at STEP 220, the flow 200 proceeds to STEP 224. At STEP 224, a determination is made whether the endpoint 102 is connected to the Internet. Responsive to a determination at STEP 224 that the endpoint 102 is not connected to the Internet, the flow 200 proceeds to STEP 222. At STEP 222, the new file is scanned against a malware-definition file in data communication with the endpoint 102.

From STEP 222, the flow 200 proceeds to STEP 226. If at STEP 220 it is determined that the new file is not an executable, the flow 200 proceeds to STEP 222. From STEP 222, the flow 200 proceeds to STEP 226.

At STEP 226, a determination is made whether the new file is good. Responsive to a determination at STEP 226 that the new file is good, the flow 200 proceeds to STEP 228. At STEP 228, access to the new file is allowed. Access to the new file typically includes the ability to execute, view, save, and transfer the new file. Other types of access, other than those listed herein, will be apparent to one of ordinary skill in the art. Additionally, at STEP 228, the new file typically is tagged with, for example, a scan date, time, location, and the like. Tagging of the new file may be accomplished by any appropriate technique. However, if at STEP 226 it is determined that the new file is not good, the flow 200 proceeds to STEP 230.

At STEP 230, the new file is quarantined on the endpoint 102 by any appropriate technique. Additionally, the application-data-signature whitelist in data communication with the endpoint 102 is updated to reflect that the new file is not good. From STEP 230, the flow 200 proceeds to STEP 248.

Responsive to a determination at STEP 224 that the endpoint 102 is connected to the Internet, the flow 200 proceeds to STEP 232. At STEP 232, the endpoint-installed application generates a new-file fingerprint. As previously discussed, the new-file fingerprint is typically a checksum or hash of the new file that is used to create a unique signature for the new file. Other types of new-file fingerprints, other than those listed herein, will be apparent to one of ordinary skill in the art. From STEP 232, the flow 200 proceeds to STEP 234. At STEP 234, the new-file fingerprint is sent to the application-verification servers 104 for verification. As previously discussed, the application-verification servers 104 list a disposition for the new-file fingerprint that includes, for example, good, not good, and unknown. Other types of dispositions, other than those listed herein, are possible. From STEP 234, the flow 200 proceeds to STEP 236.

At STEP 236, a determination is made whether the new file is good. Responsive to a determination at STEP 236 that the new file is not good, the flow 200 proceeds to STEP 238. At STEP 238, the new file is quarantined on the endpoint 102 by any appropriate technique. Additionally, at STEP 238 the application-data-signature whitelist on the endpoint 102, as well as any other endpoints, are updated to reflect that the new file is not good. However, if at STEP 236 it is determined that the new file is good, the flow 200 proceeds to STEP 240. At STEP 240, the application-data-signature whitelist on the application-verification servers 104 is updated to reflect that the new file is good. Additionally, at STEP 240 access to the new file is allowed on the endpoint 102. As previously discussed, access to the new file by the endpoint 102 typically includes the ability to execute, view, save, and transfer the new file. However, responsive to a determination of unknown at STEP 236, the flow 200 proceeds to STEP 242.

At STEP 242, the new file is scanned against a malware-definition file in data communication with the application-verification servers 104. From STEP 242, the flow 200 proceeds to STEP 244.

At STEP 244, a determination is made whether the new file is bad. Responsive to a determination at STEP 244 that the new file is bad, the flow 200 proceeds to STEP 246. At STEP 246, the new file is quarantined on the endpoint 102 by any appropriate technique. Additionally, at STEP 246 the application-data-signature whitelist on each endpoint 102 and the application-data-signature whitelist in data communication with the application-verification servers 104 is updated to reflect that the new file is bad. However, responsive to a determination of good or unknown at STEP 244, the flow 200 proceeds to STEP 248.

Referring now to FIG. 2B, at STEP 248, a determination is made whether to prompt the user of the endpoint 102 to proceed with a scan. Responsive to a determination at STEP 248 that the is to be prompted whether to proceed with the scan, the flow 200 proceeds to STEP 249. However, responsive to a determination that the user is not to be prompted to proceed with a scan, the flow 200 proceeds to STEP 251.

At STEP 249, the user is prompted with options, such as, for example, proceed with scan and cancel. Prompting of the user may be through of a variety of appropriate techniques, including, for example a command line or a graphical user interface. Other types of prompting techniques, other than those listed herein, can also be employed. From STEP 249, the flow 200 proceeds to STEP 250.

At STEP 250, a determination is made by the endpoint 102 whether the user has opted to proceed with the scan. The user's response to the prompting of STEP 249 may be made through of a variety of appropriate techniques, including, for example a command line or a graphical user interface. Other types of response techniques, other than those listed herein, can also be employed. Responsive to a determination at STEP 250 that the user opted to proceed with the scan, the flow 200 proceeds to STEP 251. However, responsive to a determination at STEP 250 that the user opted to cancel, the flow 200 stops at STEP 250.

At STEP 251, the new file is sent to a cloud-based, malware-scan server such as, for example, the malware-scan server 106 to be scanned. From STEP 251, the flow 200 proceeds to STEP 252. At STEP 252, the new file is scanned by the cloud-based malware-scan server 106 using, for example, malware definitions and malware scanning engines. Other types of scanning techniques, other than those listed herein, can also be employed. From STEP 252, the flow 200 proceeds to STEP 254.

At STEP 254, a determination is made whether the new file is good. Responsive to a determination that the new file is good at STEP 254, the flow 200 proceeds to STEP 256.

At STEP 256, the new file is tagged for further analysis using any appropriate tagging technique understood as appropriate by one of ordinary skill in the art. From STEP 256, the flow 200 proceeds to STEP 258. At STEP 258, the application-data-signature whitelist on each endpoint 102 is updated to reflect that the new file is good. Additionally, access is allowed to the new file on the endpoint 102. As previously discussed, access to the new file on the endpoint 102 typically includes the ability to execute, view, save, and transfer the new file. Other types of access, other than those listed herein, can also be employed.

However, if at STEP 254 it is determined that the new file is not good, the flow 200 proceeds to STEP 260. At STEP 260, the application-data-signature whitelist in data communication with the application-verification servers 104 is updated to reflect that the file is not good. From STEP 260, the flow 200 proceeds to STEP 262.

At STEP 262, a command is sent by the cloud-based malware-scan server to the endpoint 102 instructing the endpoint 102 to quarantine the new file using any appropriate technique. From STEP 262, the flow 200 proceeds to STEP 264. At STEP 264, the application-data-signature whitelist on the endpoint 102, as well as any other endpoints, are updated to reflect that the new file is not good. From STEP 264, the flow 200 proceeds to STEP 266. At STEP 266, a request is made for the endpoint 102, as well as any other endpoints, to update their malware definition file in order to be able to detect the new file.

Figure 3:
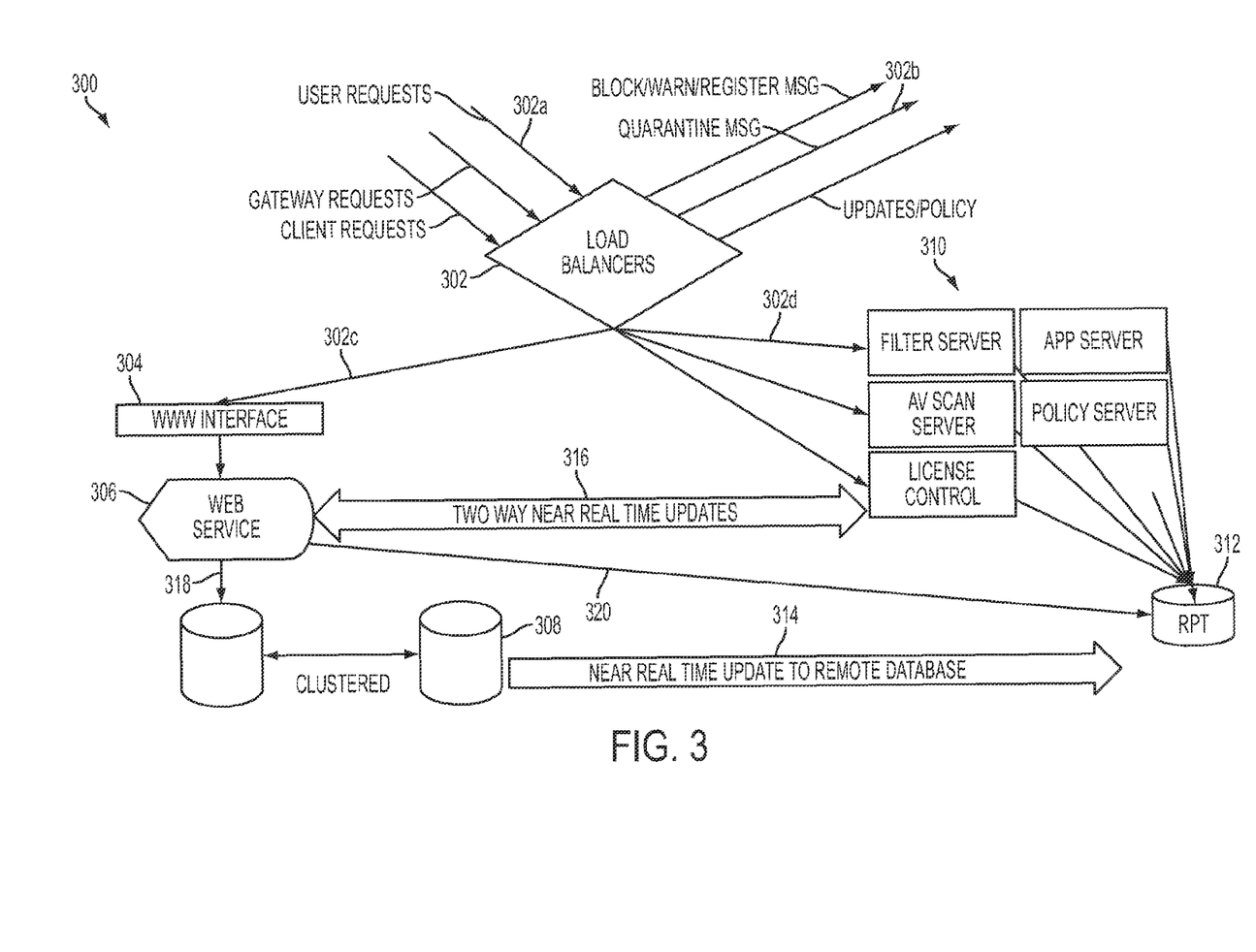
FIG. 3 illustrates a malware-protection system.

FIG. 3 illustrates a malware-protection system 300. Request data 302a such as, for example, user requests, gateway requests, client requests, and the like are received by a load balancer 302. In a typical embodiment, the load balancer 302 outputs data 302b, which can include, for example, block/warn/register messages, quarantine messages, updates, and policy. The load balancer 302 also forwards the user requests 302a via a connection 302c to a world wide web (WWW) interface 304. The load balancer 302 also forwards data 302d to a filter server, application server, antivirus scan server, policy server, and license control server (collectively "server 310").

In a typical embodiment, the WWW interface 304 forwards the request data 302a to a web service 306 that pushes two-way real-time or near-real-time updates 316 to the server 310. The web service also pushes data 318 and data 320 to clustered databases 308 in a local data center and a reporting server 312, respectively. The clustered databases 308 push real-time or near-real-time updates 314 to a remote database (not shown). The server 310 pushes data to the reporting server 312 which receives the data 320 from the web service 306.

Figure 4:
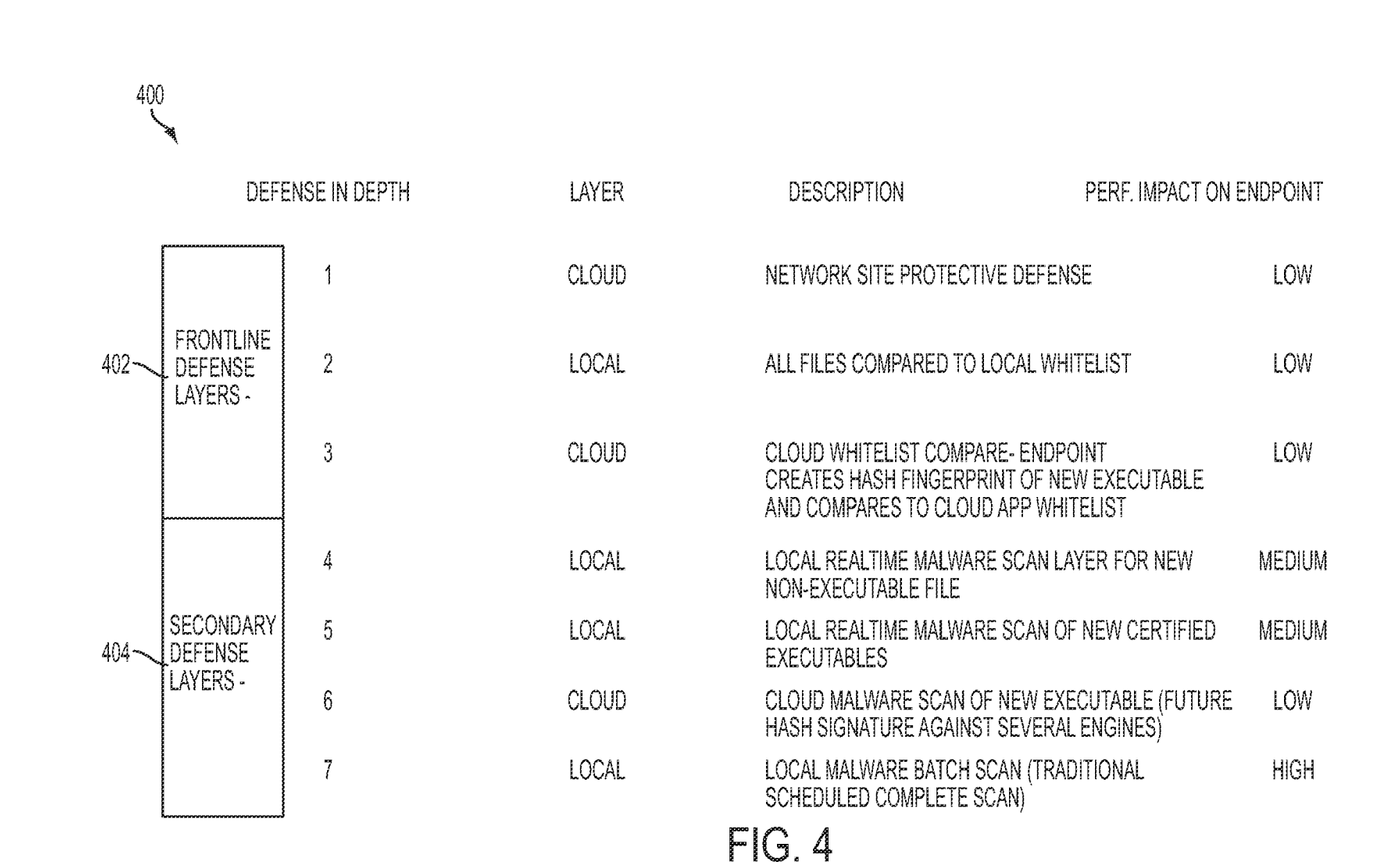
FIG. 4 illustrates defense layers and the computer-performance impact of a malware-protection method.

FIG. 4 illustrates defense layers 400 that include frontline defense layers 402 and secondary defense layers 404. FIG. 4 also details a computer-performance impact of the malware-protection method on the endpoint 102, or any other endpoints. The frontline defense layers 402, which include defense depths 1-3, provide the majority of the overall protection, while the secondary defense layers 404, which include defense depths 4-7, provide the remainder of the overall protection.

For the purposes of this application, a local layer is where malware-protection method steps performed by the endpoint 102 occur. For example, STEPS 213-232 are performed in the local layer. Likewise, for the purposes of this application, a cloud layer is where all other steps of the malware-protection method are performed by components of the malware-protection system other than the endpoint 102. For example, STEPS 202-208 are performed in the cloud layer.

Defense depth 1 is in the cloud layer and has a low performance impact on the endpoint 102. For example, as described in FIG. 1 and FIG. 2, STEP 1 and STEPS 202-208 occur at defense depth 1.

Defense depth 2 is in the local layer and has a low performance impact on the endpoint 102. For example, as described in FIG. 2, STEP 214 occurs at defense depth 2.

Defense depth 3 is in the cloud layer and has a low performance impact on the endpoint 102. For example, as described in FIG. 2, STEP 234 occurs at defense depth 3.

Defense depth 4 is in the local layer and has a medium performance impact on the endpoint 102. For example, as described in FIG. 2, STEP 222 occurs at defense depth 4.

Defense depth 5 is in the local layer and has a medium performance impact on the endpoint 102. For example, as described in FIG. 2, STEP 222 occurs at defense depth 5.

Defense depth 6 is in the cloud layer and has a low performance impact on the endpoint 102. For example, as described in FIG. 2, STEPS 251-252 occur at defense depth 6.

Defense depth 7 is in the local layer and has a high performance impact on the endpoint 102. For example, as described in FIG. 2, STEP 202 occurs at defense depth 7 where a new-file access request is made by the endpoint 102 as part of a scheduled, batch-type process.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein. For example, various steps described as being performed by a particular entity could in some embodiments be performed in whole or in part by another entity without departing from the scope of the invention.

What is claimed is:

1. A malware-protection method comprising:
    (a) providing a processor;
    (b) providing a memory interoperably coupled to the processor and having computer code stored thereon;
    (c) using the processor and the memory in combination to perform at least one of steps (d)-(k);
    (d) responsive to an access request for a new file from an endpoint computer of a plurality of endpoint computers, verifying, as safe for access, an access location of the new file;
    (e) receiving, on the endpoint computer, the new file;
    (f) responsive to step (e), comparing the new file against an application-data-signature whitelist in data communication with the endpoint computer;
    (g) responsive to a new-file status of unknown in response to step (f), transmitting a generated new-file fingerprint to application-verification server;
    (h) responsive to step (g), comparing the generated new-file fingerprint against an application-data-signature whitelist in data communication with the application verification server;
    (i) responsive to a new-file status of unknown in response to step (h), scanning the new file against a malware-definition file in data communication with the application-verification server;
    (j) responsive to a new-file status of unknown in response to step (i), sending the new file to a cloud-based malware-scanning engine;
    (k) responsive to a determination by the cloud-based malware-scanning engine that the new file is not good:
        updating the application-data-signature whitelist in data communication with the application-verification server;
        commanding the endpoint computer to quarantine the new file;
        updating the application-data-signature whitelist in data communication with a plurality of endpoint computers of the plurality of endpoint computers; and
        requesting a malware definition file update for each of the plurality of endpoint computers in data communication with the application-data-signature whitelist.

2. The malware-protection method of claim 1, wherein, responsive to a new file status of unknown in response to step (f), scanning the new file on the endpoint computer with a malware-definition file in data communication with the endpoint computer.

3. The malware-protection method of claim 2, wherein, responsive to a determination that the new file is not good:
   quarantining the new file on the endpoint computer; and
   updating the application-data-signature whitelist in data communication with the endpoint computer to reflect that the new file is not good.

4. The malware-protection method of claim 1, wherein the access request is performed in real-time.

5. The malware-protection method of claim 1, wherein the access request is performed as a scheduled batch process.

6. The malware-protection method of claim 1, wherein, responsive to a new-file status of not good in response to step (f), quarantining the new file on the endpoint computer.

7. The malware-protection method of claim 1, wherein the new-file fingerprint comprises at least one of a checksum and a hash of the new file.

8. The malware-protection method of claim 1, wherein the application-verification server of step (g) is located at a remote destination from the endpoint computer.

9. The malware-protection method-protection method of claim 1, comprising, prompting a user prior to the new file being sent to the cloud-based malware-scanning engine.

10. The malware-protection method of claim 1, wherein, responsive to a determination in response to step (h) that the file is not good:
    quarantining the new file on the endpoint computer; and
    updating the application-data-signature whitelist in data communication with the plurality of endpoint computers of the plurality of endpoint computers to reflect that the new file is not good.

11. A malware-protection system comprising:
    a plurality of endpoint computers;
    a load balancer;
    wherein the load balancer receives an access request for a new file at an access location from an endpoint computer of the plurality of endpoint computers;
    a filter server having a network-site-verification application executing thereon;
    wherein the network-site-verification application executing on the filter server determines, as safe for access, the access location of the new file prior to the new file being downloaded to the endpoint computer;
    an application-data-signature whitelist in data communication with the endpoint computer;
    wherein the new file is compared against the application-data-signature whitelist in data communication with the endpoint computer to determine whether the file is good;
    an endpoint-installed application executing on the endpoint computer;
    wherein the endpoint-installed application generates a new-file fingerprint responsive to a determination of unknown responsive to the comparison of the new file against the application-data-signature whitelist in data communication with the endpoint computer;
    an application-verification server in data communication with an application-data-signature whitelist;
    wherein the new-file fingerprint is compared against the application-data-signature whitelist in data communication with the application-verification server;
    a malware-definition file in data communication with the application-verification server;
    wherein, responsive to a determination of unknown responsive to the comparison of the new-file fingerprint to the application-data-signature whitelist in data communication with the application verification server, the new file is scanned against the malware definition file in data communication with the application-verification server;
    a cloud-based malware-scanning engine;
    wherein, responsive to a determination of unknown responsive to the scan of the new-file against the malware definition file in data communication with the application-verification server, the new file is sent to the cloud-based, malware-scanning engine.

12. The malware-protection system of claim 11, wherein, the endpoint computer scans the new file against a malware-definition file in data communication with the endpoint computer responsive to the unknown status determination responsive to the comparison of the new file against the application-data-signature whitelist in data communication with the endpoint computer.

13. The malware-protection system of claim 12, wherein, responsive to a determination that the new file is not good:
    the endpoint computer quarantines the new file; and
    the application-data-signature whitelist in data communication with the endpoint computer is updated to reflect that the new file is bad.

14. The malware-protection system of claim 11, wherein the load balancer processes the access request in real-time.

15. The malware-protection system of claim 11, wherein the load balancer processes the access request as a scheduled batch process.

16. The malware-protection system of claim 11, wherein, the endpoint computer quarantines the new file responsive to a not good status determination responsive to the comparison of the new file against the application-data-signature whitelist in data communication with the endpoint computer.

17. The malware-protection system of claim 11, wherein the new-file fingerprint comprises at least one of a checksum and a hash of the new file.

18. The malware-protection system of claim 11, wherein the application-verification server is located at a remote destination from the endpoint computer.

19. The malware-protection system of claim 11, the malware-protection system comprising:
    a prompt; and
    wherein a user is presented with the prompt in order to make a determination whether to send the new file to the cloud-based, malware-scanning engine to be scanned.

20. The malware-protection system of claim 11, wherein, responsive to a not good determination responsive to the comparison of new-file fingerprint against the application-data-signature whitelist in data communication with the application-verification server:
    the application-verification server instructs the endpoint computer to quarantine the new file; and
    the application-verification server updates the application-data-signature whitelist in data communication with the plurality of endpoint computers of the plurality of endpoint computers to reflect that the new file is not good.

* * * * *